United States Patent [19]
Thomas et al.

[11] 3,883,625

[45] May 13, 1975

[54] METHOD FOR MAKING EXPANDABLE PLASTICS

[75] Inventors: Lowell S. Thomas; Kenneth J. Cleereman, both of Midland, Mich.

[73] Assignee: The Dow Chemical Company, Midland, Mich.

[22] Filed: Mar. 29, 1973

[21] Appl. No.: 345,885

Related U.S. Application Data

[60] Continuation-in-part of Ser. No. 14,882, Feb. 12, 1970, abandoned, which is a division of Ser. No. 691,299, Dec. 18, 1967, abandoned.

[52] U.S. Cl. ............... 264/45.6; 161/161; 264/50; 264/52; 264/53; 264/321; 264/DIG. 5
[51] Int. Cl. ............................................. B29d 27/00
[58] Field of Search ............ 264/45, 50, 51, 53, 54, 264/52, 321, DIG. 5; 161/161

[56] References Cited
UNITED STATES PATENTS

| | | | |
|---|---|---|---|
| 3,300,552 | 1/1967 | Shelby | 264/45 |
| 3,324,211 | 6/1967 | Maurer et al. | 264/53 |
| 3,444,036 | 5/1969 | Russell et al. | 161/161 |
| 3,449,477 | 6/1969 | Logomasini | 264/45 |
| 3,531,554 | 9/1970 | Shelby et al. | 264/53 |
| 3,784,658 | 1/1974 | Studer | 264/53 |

*Primary Examiner*—Donald E. Czaja
*Assistant Examiner*—H. H. Fletcher
*Attorney, Agent, or Firm*—Robert B. Ingraham

[57] ABSTRACT

Layered sheet having selectively foamable layers is prepared employing a laminate of at least three layers of synthetic resinous materials, the outer layers are relatively permeable to a blowing agent and a central layer is relatively impermeable to a blowing agent. The laminated sheet is impregnated with a fluid (either liquid or gaseous blowing agent), the sheet exposed to conditions which permit loss of the blowing agent from the outer layers and subsequently heated to foam an inner or central layer.

8 Claims, 5 Drawing Figures

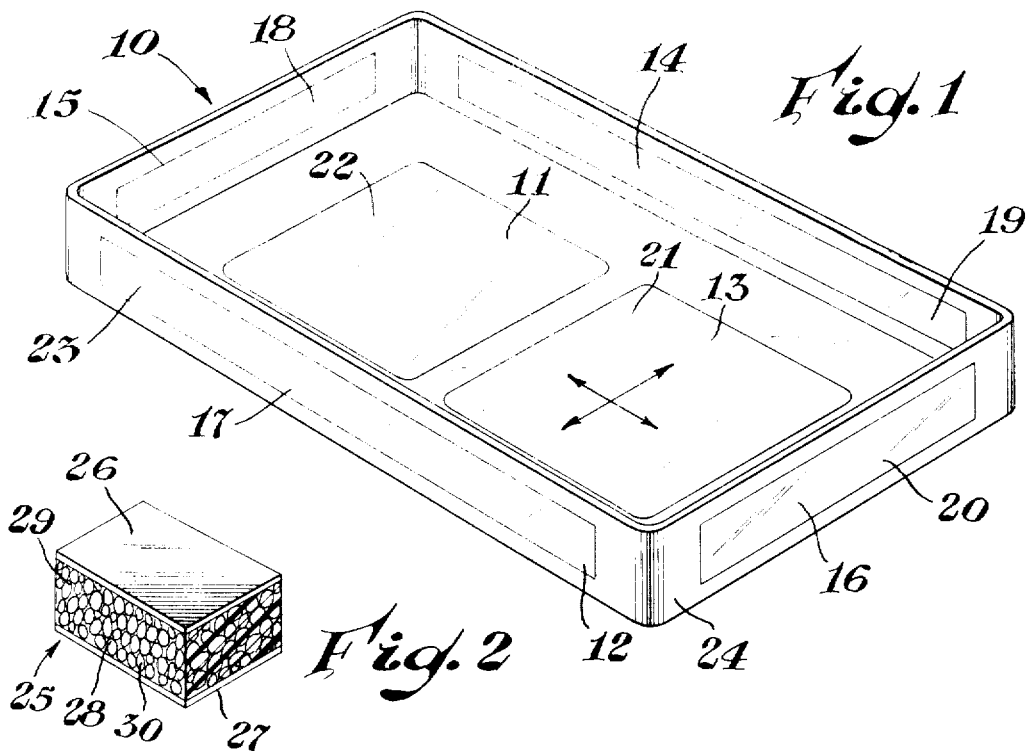
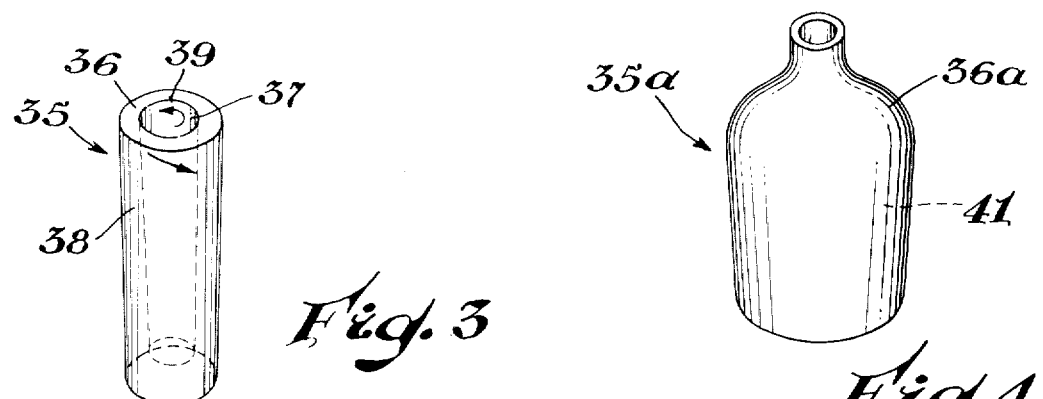
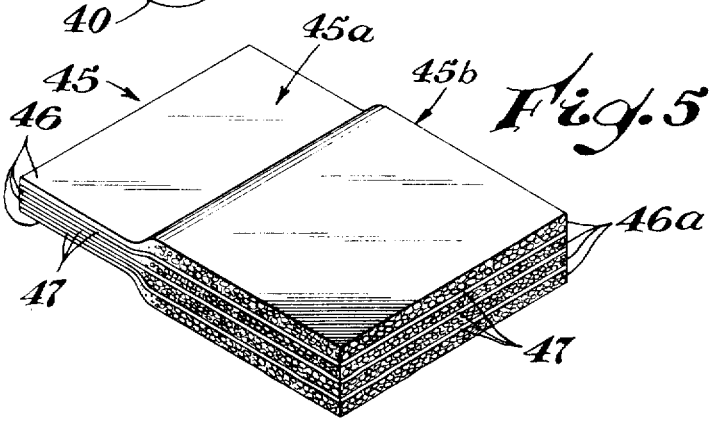

METHOD FOR MAKING EXPANDABLE PLASTICS

This application is a continuation-in-part of our copending application Ser. No. 14,882, filed Feb. 12, 1970, now abandoned, which in turn is a divisional application of our earlier filed application Ser. No. 691,299, filed Dec. 18, 1967, now abandoned.

This invention relates to a method for the preparation of expandable synthetic resinous articles, and more particularly relates to the preparation of synthetic resinous articles which expand generally in one direction.

Many synthetic resinous expandable bodies are known. Such expandable bodies most frequently are prepared by the inclusion of a blowing or raising agent within a mass of synthetic thermoplastic resinous material, raising such a mass to a temperature which causes heat plastification thereof and devolatilization or decomposition of the raising or foaming agent to provide an article composed of a plurality of closed cells. Such foamed articles are well known and widely used in commerce. Oftentimes it is desirable to expand synthetic resinous bodies of a predetermined configuration and subsequently cause them to be foamed at a later date. For example, it would be desirable if there were available a synthetic resinous thermoplastic sheet which could be heat plastified in an unexpanded form which would subsequently expand and be capable of pressure forming. By "pressure forming" is meant vacuum forming, blow molding and the like. One significant and substantial difficulty exists with such a sheet or article and that is when the sheet or article is subjected to sufficient heat to cause it to foam, it expands generally isotropically; that is, in all three dimensions. Such a phenomenon is most undesirable, for example, in a vacuum forming operation where a sheet is confined or restrained about its periphery and the central portion raised to a heat plastifying and foaming temperature. The result is that the sheet expands both in thickness as well as length and width, oftentimes causing undesired wrinkles and non-uniform heating due to sagging of the sheet away from a generally planar heating platen. Similarly, in the preparation of blow molded articles such as hollow containers, uncontrolled foaming of a prefabricated parison results in a parison which is too large to fit the mold or oftentimes results in undesired contact of the foamed parison with the mold prior to blowing and a non-uniform container.

Frequently it is desirable to prepare synthetic resinous foamable bodies which may be selectively foamed for decorative utilitarian purposes. A high degree of foaming with a non-expandable synthetic resinous body oftentimes results in undesired distortion of the foamed area rather than a generally uniform increase in the thickness thereof.

An object of this invention is to provide an improved method for the preparation of synthetic resinous expandable articles.

A further object of this invention is to provide an improved method for the preparation of expandable synthetic resinous sheet which may be thermoformed without undue distortion.

Still another object of this invention is to provide an improved method for the preparation of synthetic resinous expandable sheet which may be selectively foamed without undue distortion.

Another object of this invention is to provide a method for the preparation of a synthetic resinous thermoplastic expandable article in which the major portion of the expansion occurs in one direction.

These benefits and other advantages in accordance with the present invention are achieved in a method for the preparation of a synthetic resinous foamable body which comprises providing a laminate having at least first and second outer layers and at least one inner layer, the outer layers and inner layer being of synthetic resinous material, the layers being adhered together, contacting the laminate with a foaming agent which is generally a non-solvent for both the outer and inner layers and which preferentially remains in the inner layer, removing the blowing agent from the outer layers and subsequently heating the inner layer to a temperature sufficient to cause expansion thereof by the formation of a plurality of gas-containing closed cells within the inner layer.

The method of the present invention is readily practiced with a wide variety of synthetic resinous thermoplastic materials. Materials which may be utilized in the practice of the present invention are those which are thermoplastic and may have a foaming agent incorporated therein. The synthetic resinous materials must also be thermoplastic. Such thermoplastic resinous materials include orientable alkenyl aromatic resins. By "alkenyl aromatic resin" is meant a solid polymer of one or more polymerizable alkenyl aromatic compounds. The polymer or copolymer comprises, in chemically combined form, at least 50 percent by weight of at least one alkenyl aromatic compound having the general formula

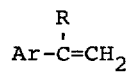

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as divinylbenzene, methylmethacrylate or acrylonitrile, etc.

Also useful in the practice of the present invention are synthetic linear polyesters prepared by reacting terephthalic acid, dialkyl terephthalates, or ester-forming derivatives thereof with a glyccol of the series HO(CH$_2$.)$_n$OH, where n is a whole number within the range of 2-10. They may also include up to 20 percent by weight of a second acid or ester thereof, said second acid being selected from the group consisting of isophthalic acid, dibenzoic acid, hexa-hydroterephthalic acid, adipic acid, sebacic acid, azelaic acid, naphthalic acid, 2,5-dimethyl terephthalic acid, and bis-p-carboxyphenoxy ethane.

The practice of the invention is also successful with other thermoplastic resinous materials well known to the art, including those which may be comprised of polymers and copolymers of methylmethacrylate, such as its homopolymer and the copolymers thereof with vinylidene chloride; thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose and the like, chlorinated polyolefins such as chlorinated polyethylene, chlorinated polypropylene and the like, as well as saran resins, which include thermoplastic copolymers of vinylidene chloride with one or more such monomers as vinyl chloride, acrylic acid and esters thereof such as ethyl acrylate, propyl acrylate and the like.

The volatile fluid foaming agents can be gases such as carbon dioxide, a saturated aliphatic hydrocarbon such as butane, isobutane, pentane, neopentane, hexane, heptane or mixtures of one or more such aliphatic hydrocarbons having a molecular weight of at least 56 and a boiling point not higher than 95°C. at 760 millimeters absolute pressure. Other suitable fluid foaming agents are the perchlorofluorocarbons such as:

$$CCl_3F$$
$$CCl_2F_2$$
$$CClF_3$$
$$CCl_2F-CCl_2F$$
$$CClF_2-CClF_2$$
$$CClF_2-CClF_2$$

$$\begin{array}{c} CF_2-CClF \\ | \quad | \\ CF_2-CF_2 \end{array}$$

$$\begin{array}{c} CF_2-CClF \\ | \quad | \\ CF_2-CClF \end{array}$$

and tetraalkyl silanes such as tetramethylsilane, trimethylethylsilane, trimethylisopropylsilane and trimethyl n-propylsilane, having a boiling point not higher than 95°C. at 760 millimeters absolute pressure. The volatile fluid foaming agent usually is employed in amounts corresponding to from about 0.05 to 0.4 gram molecular proportion of the volatile fluid compound per 100 grams by weight of the normally solid thermoplastic polymer starting material.

Multidirectional molecular orientation may be introduced into the articles in any of several ways well known in the art. For example, sheet materials are readily biaxially molecularly oriented by tentering, by simultaneously stretching a tube in two directions such as the trapped bubble process, by alternately stretching sheet in a transverse direction and longitudinal direction. Multidirection molecular orientation may be obtained by molding a heat plastified body of synthetic resinous material in a mold having a generally circular configuration, the sides of the mold are rotated relative to each other during cooling of the material to the solid state. Such molecular orientation is optionally present in composite or laminate sheets in accordance with the present invention and may be introduced either prior to lamination or after lamination.

The laminate may be fabricated by extrusion or molding, oriented if desired and subsequently treated under pressure at temperatures up to the softening temperature of the outer layers of the laminate with a suitable foaming agent such as carbon dioxide which is a poor solvent or substantially a non-solvent for the polymer at ambient temperature and pressure. The foaming agent in the presence of the polymeric body will permeate throughout the body and on subsequent heating of the body foaming will occur in the layer retaining the blowing agent. Desirably, an inner or central layer or layers are selected to retain the blowing agent.

Beneficially in the practice of the present invention, a laminated sheet containing blowing agent in one of the layers may be heat formed such as by pressure forming and subsequently foamed; or, a laminated sheet may be pressure formed, subsequently impregnated with blowing agent and then foamed. The simplest laminate contemplated by the present invention comprises three layers. It is advantageous to employ a three layer structure wherein the central layer is foamable and the surface layers are not. This results in a relatively rigid article having wear resistant surfaces. Oftentimes, significant benefit is obtained by providing a plurality of foamable and unfoamable layers such as are depicted in FIG. 5 wherein the resultant structure exhibits rigidity as well as substantial thermal insulation and physical strength.

In selecting the resinous materials for the preparation of laminate structures in accordance with the present invention, a relatively simple test provides a clear indication of the desirability or undesirability of any particular combination of two or more synthetic resinous materials. Such an evaluation is readily accomplished by subjecting a plurality of samples of the thermoplastic resinous compositions desired to an atmosphere of a particular blowing agent under suitable temperature and pressure for impregnation, removal of the components from the blowing agent-impregnating atmosphere, storage under ambient conditions generally equivalent to the required length of time, temperature and pressure conditions which will exist between impregnation of a laminate and subsequent foaming, and subsequently subjecting the various samples to a foaming condition. The samples which foam indicate the polymer composition suitable for the foamable layer and samples which do not foam indicate their suitability for the non-foamable layer. For example, one particularly beneficial and advantageous pair of polymer compositions are low density polyethylene and chlorinated polyethylene containing about 35 weight percent chlorine when employed with a carbon dioxide foaming agent and also with Freon-12. Such layers are suitable for use in a wide variety of fabricating techniques. One particularly advantageous embodiment is the preparation of foam insulating bands which comprise a laminate of foamable and non-foamable compositions formed into a loop or band which is a loose fit for a vessel to be insulated. The loop is slipped over the vessel, foamed to cause expansion of the central layer to an extent sufficient to cause an interference fit between the loop and the vessel and a permanent insulating layer is thereby provided. The sheet, when restrained at the edges in a frame of a vacuum former, on heating and foaming remains tight and does not sag or give undesired wrinkles or have undesired contact with the mold prior to the application of vacuum. Similarly, when a tubular item such as a parison for a bottle or tube having a generally centrally foamable layer is prepared which is to be molded such as by a blow molding process, expansion of the parison prior to blowing is not readily tolerated and is objectionable, as contact with a heating mandrel is lost and heat transfer to the parison is reduced. Also, in some instances, it is desirable to impart sufficient orientation to a tubular wall such that the diameter decreases somewhat on foaming as in instances where a foamable or insulation material is being disposed about a cylindrical or even a tapered body. Shrinkage on foaming reduces somewhat the degree of expansion but permits the article to foam, contract in diameter and conform closely to the external dimensions of the article being covered such as a pipe, cup or similar substrate.

Further features and advantages of the present invention will become more apparent from the following specification when taken in connection with the drawing wherein:

FIG. 1 is a schematic representation of a foamable body in accordance with the invention selectively foamed.

FIG. 2 is a view of a section of a foamed sheet prepared in accordance with the invention.

FIG. 3 is a view of a generally cylindrical multiaxial molecularly oriented body in accordance with the invention.

FIG. 4 is a formed, foamed molded body prepared by the method of the invention.

FIG. 5 is a schematic representation of a multilayer sheet, part of which is foamed.

In FIG. 1 there is illustrated a partially foamed body in accordance with the present invention generally designated by the reference numeral 10. The body 10 has a tray- or container-like configuration having a first major surface 11 and a second major surface 12. The body 10 is composed of at least three layers of oriented synthetic resinous thermoplastic materials, the inner layer having a foaming agent disposed therein. The body 10 has been formed from a flat sheet by thermoforming means. The body 10 comprises a bottom 13, sides 14, 15, 16 and 17 forming a generally rectangular tray. The body 10 has a plurality of unfoamed portions 18, 19, 20, 21, 22 and 23, the remaining portion of the body 24 being foamed. The body of FIG. 1 is readily formed from a foamable sheet in accordance with the present invention by selectively heating a flat foamable sheet in the regions where foaming is desired until the temperature of the body is sufficient for foaming and thermoforming. Vacuum or pressure is then applied to conform the partially heat plastified and partially foamed sheet into the desired configuration. Such selective foaming is readily accomplished in a conventional vacuum forming apparatus by providing a heating platen with masks generally corresponding to the unfoamed area, or alternately by selectively impregnating a laminated sheet of material with blowing agents wherein the unfoamed areas are masked during the impregnation operation to prevent entrance of the blowing agents. Alternatelly, such a body is formed by impregnating the entire sheet and masking the areas in which foaming is desired by means of a suitable gas barrier to prevent escape of the blowing agent and permitting the blowing agent to escape by diffusion from the unmasked portion. Suitable gas barriers are metallic tapes or gas barrier synthetic resins such as vinylidene chloride polymers containing at least about 70 weight percent vinylidene chloride.

Expandable layered sheets in accordance with the invention which expand selectively may be prepared by either preventing entrance of a volatile fluid foaming agent into selected portions of the sheet by means of a barrier coating applied prior to impregnation or by applying a barrier coating after impregnation and selectively preventing the escape of the fluid foaming agent. Generally, fluid foaming agents diffuse into or out of the sheet or body at rates peculiar to a particular foaming agent and the composition of the sheet. Thus, by selecting an appropriate time, portions of the sheet are selectively foamed.

By way of illustration, if a sheet of given thickness of, for example, polystyrene is coated with a vinylidene chloride polymer on one side, the entire sheet may readily be foamed. However, assuming that the vinylidene chloride polymer is a barrier for the particular foaming agent employed, such as carbon dioxide for a given thickness of sheet, the sheet will require about twice the length of time to become impregnated with carbon dioxide or the fluid foaming agent as would a sheet having no coating. A barrier coating such as a synthetic resin has a finite permeability to blowing agents, and an indefinite exposure of a selectively masked sheet to impregnation conditions results in uniform impregnation of the sheet. Indefinite exposure of a masked impregnated sheet to conditions which would cause the volatile fluid foaming agent to be removed from the sheet results in no foaming. However, for practical purposes, when using highly volatile foaming agents, suitable times are employed which are readily calculated employing known permeability or diffusion data.

In FIG. 2 there is depicted a greatly enlarged foamed laminated sheet portion 25. The foamed sheet portion 25 has a first surface 26 of a generally continuous noncellular nature. The body 25 has a second surface 27 similar to the surface 26 and of a continuous nonfoamed nature. A core 28 is disposed between the surfaces 26 and 27. The core 28 comprises a plurality of thin membranes 29 defining a plurality of closed cellular spaces 30.

In FIG. 3 there is depicted a body 35 in accordance with the invention. The body 35 is of three layers (generally concentric cylinders) wherein the central layer is foamable. The body 35 has a generally cylindrical or narrowly tapering frustoconical configuration. The body 35 has a wall portion 36, an inner surface 37 and an outer surface 38. The body 35 is composed of a multidirectionally molecularly oriented synthetic resinous material containing a foaming or raising agent. The body 35 has an opening or upper end 39 and a closed or lower end 40. The direction of molecular orientation adjacent the surfaces of the body is indicated by the arrows disposed on the surfaces 37 and 38. Beneficially, the oriented foamable body such as the body 35 is beneficially prepared by rotary molding hereinbefore described wherein the orientation of the synthetic resinous material occurs within a mold having rotating surfaces which rotate as the material cools below its thermoplastic temperature.

In FIG. 4 there is shown a container 35a. The container 35a defines an internal cavity 41 and a wall portion 36a having a core of foamed synthetic resinous material. The container 35a is obtained from the body of FIG. 3 by heating the body 35, causing it to foam, subsequently applying internal pressure within the body and causing it to conform to a mold of desired configuration.

In FIG. 5 there is depicted a partially foamed multilayer sheet generally designated by the reference numeral 45. The sheet 45 comprises an unfoamed portion 45a and a foamed portion 45b. In the unfoamed portion 45a is a plurality of layers 46 of synthetic resinous material interleaved with a plurality of layers 47 of diverse synthetic resinous material. Incorporated within the sheet 45 is a foaming agent. The layers 46 and 47 are adhered to each other to form a unitary structure. The foamed portion 45b comprises a plurality of foamed layers 46a interleaved with the unexpanded layers 47.

A wide variety of shapes and forms are readily prepared employing the method of the invention.

By way of further illustration, laminates are prepared from a 10 mil thick sheet of chlorinated polyethylene containing 36 weight percent chlorine. To each of the major faces of the chlorinated polyethylene layer is laminated about 6 mil thick layers of low density polyethylene to provide a laminate having a thickness of about 22 mils. A second laminate is prepared having a central layer of a copolymer of about 85 weight percent vinylidene chloride, 15 weight percent vinyl chloride having a thickness of about 1.5 mils. On either side of the vinylidene chloride polymer layer is disposed a 5 mil thick layer of chlorinated polyethylene containing about 36 weight percent chlorine and outer or surface layers of a low density polyethylene about 6 mils in thicknesss are adhered to the chlorinated polyethylene layers. Samples of both laminates are pressurized under an atmosphere of carbon dioxide at 900 pounds per square inch for about 20 minutes at 25°C. Samples of the laminates are removed from the carbon dioxide atmosphere and placed in water at a temperature of 65°C. until apparent expansion of the laminates ceases. Examination of each of the laminates indicates that the chlorinated polyethylene layers expand to about 10 times their original thickness. Samples of the laminates are subjected to Freon-12 for 16 hours at a temperature of 100°C., subsequently removed from the Freon-12 atmosphere and immersed in water at a temperature of 66°C. until foaming is complete. Examination of the laminates indicates that expansion occurs only in the chlorinated polyethylene layers, and, as in the previous illustrations, in a direction perpendicular to the surface of the sheet.

Repetition of the foregoing illustration with preformed laminates; that is, vacuum formed portions of the laminates, provides articles having the desired form and without substantial distortion on foaming other than desired increase in thickness. Beneficially, it is frequently desirable to employ foaming agents in combinations such as chlorofluorohydrocarbons in combination with carbon dioxide in that frequently impregnation takes place more rapidly and a finer cell structure is provided.

By way of further illustration, a number of biaxially oriented sheets of various polymers are pressurized in carbon dioxide at a temperature of 35°C. for about 1 hour under a pressure of 800 pounds per square inch. The biaxially oriented sheets are subsequently removed, stored at room conditions for 5 minutes, then heated by means of radiant heat to a temperature sufficient to cause foaming. The results are set forth in the following Table I.

TABLE I

| | Material | Foaming Characteristics |
|---|---|---|
| (A) | low density polyethylene — 5 mils in thickness | does not foam |
| (B) | polypropylene — 10 mils in thickness | does not foam |
| (C) | polypropylene — 100 mils in thickness | does not foam |
| (D) | rigid polyvinyl chloride — 10 mils in thickness | foams well with small uniform cells |
| (E) | rigid polyvinyl chloride — 15 mils in thickness | foams well with small cells |
| (F) | one mil plasticized polyvinyl chloride film | foams well |
| (G) | a 4 mil film of a copolymer of 73 parts vinylidene chloride and 27 parts vinyl chloride plus about 5 weight percent plasticizer | foams well with a leathery appearance and feel |
| (H) | ethyl cellulose — 10 mils in thickness | does not foam |
| (I) | 3 mil cellulose acetate | does not foam |
| (J) | 5 mil cellulose butyrate | does not foam |
| (K) | 4 mil cellulose propionate | does not foam |
| (L) | 10 mil thick film of a copolymer of 72 weight percent styrene and 28 weight percent acrylonitrile | foams as polystyrene |
| (M) | a polycarbonate resin commercially available under the tradename of Lexan — 20 mils in thickness | foams well with small cells |
| (N) | oriented polystyrene 10 mils in thickness having a vinylidene chloride copolymer on one surface* | foams well with shrinkage at the coated surface |

*Pressurized with $CO_2$ for one hour at room temperature and 170 pounds per square inch gauge.

In the foregoing table, foaming is considered as a significant increase in thickness; the appearance of a few random bubbles or opaquing is regarded as nonfoaming.

A plurality of multilayer laminates are prepared and treated by pressurizing with carbon dioxide at about 25°C. for a period of ½ hour under a pressure of about 900 pounds per square inch. After being removed from the pressurized vessel the laminates are placed in a circulating air oven at a temperature of 130°C. for a period of about 30 seconds. The composition of the laminates, including thickness of the various layers and results of the foaming, are set forth in Table II which follows.

TABLE II

| SAMPLE NO. | LAYERS* | APPROXIMATE LAYER THICKNESS (mils) | APPROXIMATE TOTAL LAYER THICKNESS (mils) | RESULTS |
|---|---|---|---|---|
| 1 | PP/CPE/PP | 4/7/4 | 15 | foam delaminates if heated too soon after removal from oven; foaming of CPE layer only |
| 2 | PE/CPE/PE | 4/8/4 | 16 | only CPE layer foamed well |

TABLE II -Continued

| SAMPLE NO. | LAYERS* | APPROXIMATE LAYER THICKNESS (mils) | APPROXIMATE TOTAL LAYER THICKNESS (mils) | RESULTS |
|---|---|---|---|---|
| 3 | PE/CPE/Saran/CPE/PE | 2/3/4/3/2 | 14 | core foamed well; outer layers unfoamed |
| 4 | PVC/CPE/Saran/CPE/PVC | 2/3/1/3/2 | 11 | Well foamed core; unfoamed skins |
| 5 | PP/CPE/Saran/CPE/PP | 1/2/4/2/1 | 10 | well foamed core; if foamed too soon, delamination occurs |

*Description of layers —
  PP = polypropylene
  CPE = chlorinated polyethylene
  PE = polyethylene
  Saran = copolymer of about 85 percent vinylidene chloride, 15 percent vinyl chloride
  PVC = polyvinyl chloride A portion of the sheet of Sample 2 is heat sealed to form a cylindrical band which fits the cup closely. On filling of the cup with hot water, the layer expands and tightens to provide a frictionally retaining insulating layer on the outer surface of the cup.

A plurality of multilayer sheets are treated by immersion in liquid dichlorodifluoromethane at room temperature and about 60 pounds per square inch pressure for about 5 days. The sheets are subsequently removed from the pressure vessel and subsequently foamed. Sheet 1 is a laminate of PE/CPE/PE which is foamed by immersion in hot water. The chlorinated polyethylene portion foams readily. It is noted that the portion of the sheet in the vapor phase of the dichlorodifluoromethane foams to a greater extent than does the portion which is immersed in the liquid phase. Similar results are obtained employing sheet 2 which is a laminate of PVC/CPE/PVC. Similar results are also obtained with sheet 3, a styrene/acrylonitrile sheet having the composition of Sample 1 in Table II, with an elastomeric block copolymer of 40 parts by weight styrene and 60 parts by weight butadiene and a skin layer of styrene/acrylonitrile copolymer. The block copolymer foams while the styrene/acrylonitrile does not. Sheet 4 is similar to sheet 3 with the exception that the outer layers are of rigid polyvinyl chloride. The core foams well but no foaming is observed in the surfaces or in the polyvinyl chloride layers. Sheet 5 is a five layer laminate of PE/CPE/Saran/CPE/PE. Similar results are obtained. However, foaming is not as extensive as it is with carbon dioxide.

In a manner similar to the foregoing illustrations, a wide variety of laminates having one or more foamed layers and one or more unfoamed layers are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a synthetic thermoplastic resinous foamable body which comprises
   providing a laminate having at least first and second unfoamable outer layers and at least one inner layer, the outer layers and inner layer being of synthetic resinous material, the layers being adhered together,
   contacting the laminate with a volatile fluid foaming agent having a boiling point not higher than 95°C. at 760 millimeters absolute pressure and a molecular weight of at least 56 to thereby impregnate at least the inner layer with foaming agent at a temperature below the softening temperature of the body,
   removing the foaming agent from the outer layers and subsequently
   heating at least a portion of the inner layer to a temperature sufficient to cause foaming or expansion by the formation of a plurality of gas-containing closed cells within the inner layer.

2. The method of claim 1 including heat forming the laminate during heating of the inner layer wherein both the inner and outer layers are raised to a heat forming temperature.

3. The method of claim 1 wherein at least one of the layers has multidirectional orientation.

4. The method of claim 1 wherein the foaming agent in the outer layers is removed by exposure to ambient conditions.

5. The method of claim 1 wherein the foamable body has a generally container-like configuration.

6. The method of claim 1 including the step of selectively foaming portions of the inner layer.

7. The method of claim 1 wherein the outer layers are of polyolefin.

8. The method of claim 1 wherein the inner layer is a polymer containing a major portion of vinylidene chloride.

* * * * *